Nov. 16, 1954
M. ROSE
2,694,225
DEVICE FOR REMOVING CURING TUBE FROM
RUBBER TIRE IN RETREADING OPERATION
Filed March 2, 1954
3 Sheets-Sheet 2
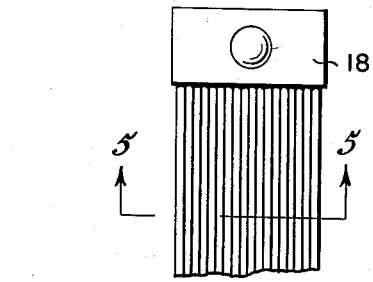
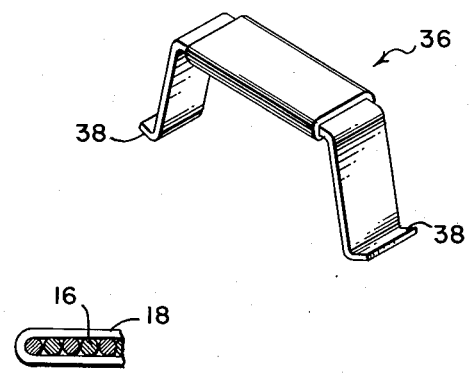
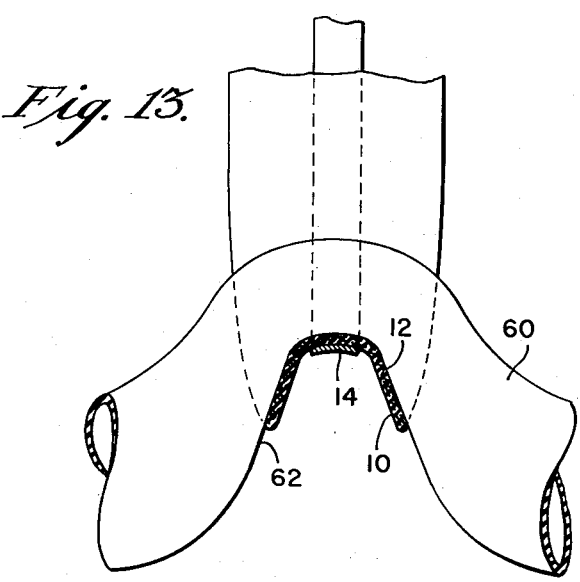
INVENTOR.
MICHAEL ROSE
BY
Caesar and Rivise
ATTORNEYS.

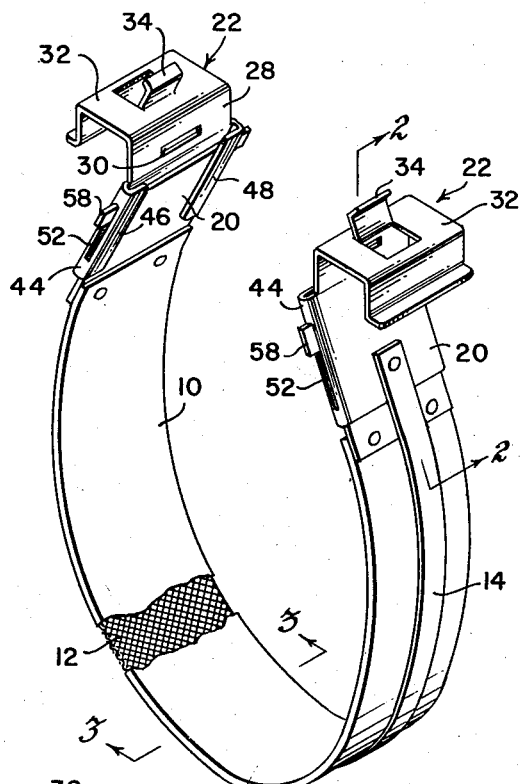
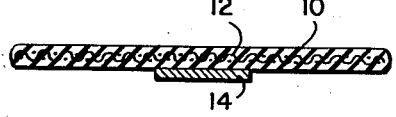
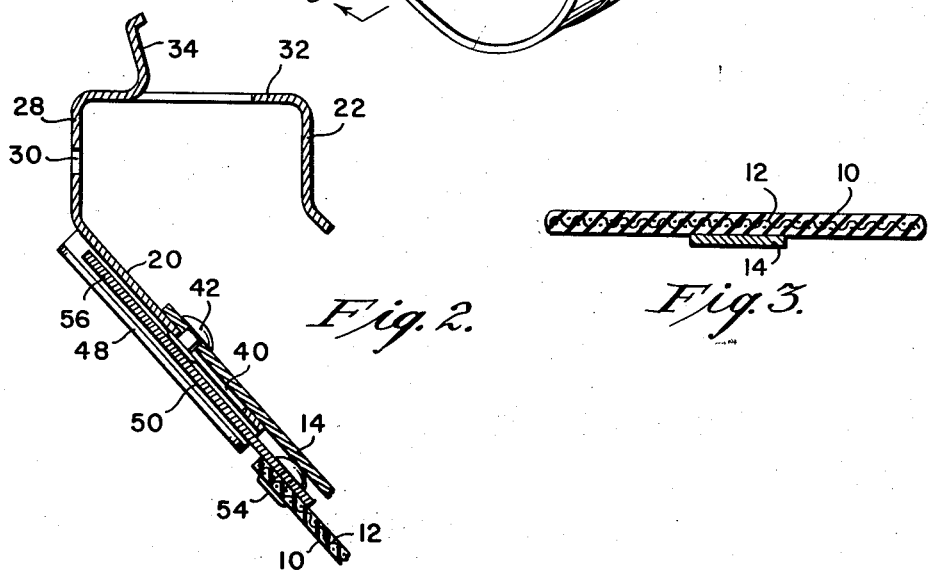

Nov. 16, 1954
M. ROSE
2,694,225
DEVICE FOR REMOVING CURING TUBE FROM
RUBBER TIRE IN RETREADING OPERATION
Filed March 2, 1954
3 Sheets-Sheet 3
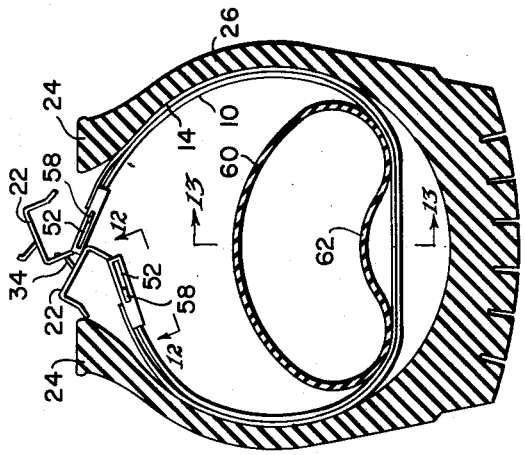
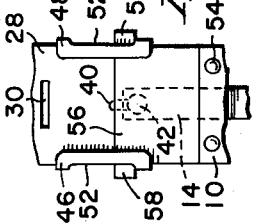
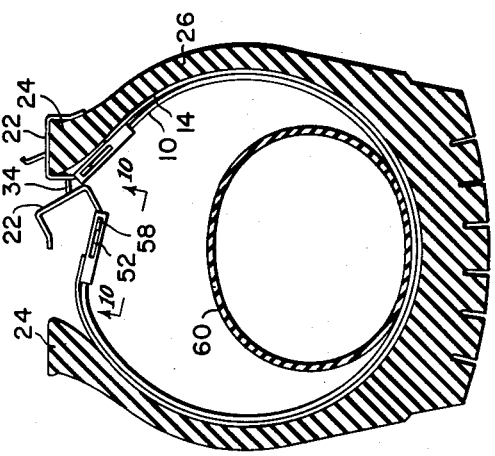
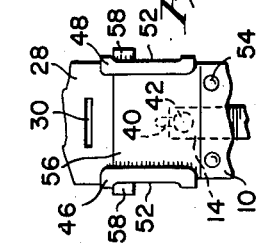
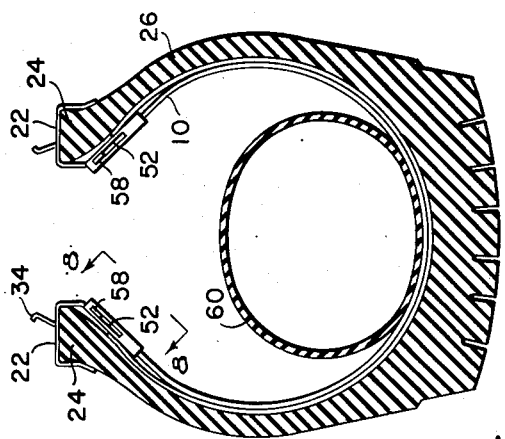
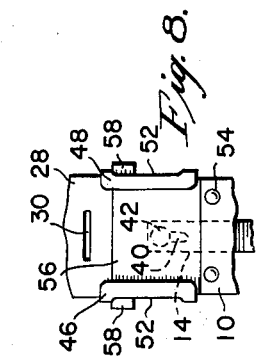
INVENTOR.
MICHAEL ROSE
BY
Caesar and Rivise
ATTORNEYS.

United States Patent Office 2,694,225
Patented Nov. 16, 1954

2,694,225

DEVICE FOR REMOVING CURING TUBE FROM RUBBER TIRE IN RETREADING OPERATION

Michael Rose, Philadelphia, Pa.

Application March 2, 1954, Serial No. 413,550

10 Claims. (Cl. 18—2)

This invention relates to a simple, inexpensive and easily manipulated device for the removal of a curing tube from a tire in the retreading operation.

In full circle treading, a heavy inflatable rubber tube, known as a curing tube is inserted in the tire and a collapsible metal rim is also positioned in the tire over the curing tube. Inflation of the curing tube will press the camelback against the matrix during the curing operation.

Heretofore, removal of the curing tube was effected by releasing the air in the tube, removing the collapsible metal rim and inserting tire irons and manipulating them until the tube is buckled and removed. The use of tire irons required time and manipulative skill and great care had to be exercised to avoid injury to the curing tube and tire cords.

The primary object of the invention is to provide a curing tube remover which overcomes all of the disadvantages residing in the conventional method of removing the tube by tire irons as above noted.

Occasionally, while the tire is in the mold during the curing operation, the curing tube blows. Heretofore, retreaders had to remove the blown tube from the tire while the tire was still in the mold, for removal of the tire from the mold would make it impossible to reinsert the tire in the mold in a position to register perfectly with the tread design. The removal of a blown tube from a tire still retained in a mold is a very difficult operation.

Another important object of the invention is to provide a curing tube remover which will simplify the removal of a blown tube from a tire while the latter is retained in the mold.

Another object of the invention is to provide a curing tube remover of such construction as to permit its placement between the tube and tire and its retention therein throughout the entire curing operation without in any way effecting the latter. Thus after curing and after removal of the collapsible metal rim, the device is immediately ready for use in removing the curing tube.

A further object of the invention is to provide a curing tube remover which is adjustable to accommodate tires of varying sizes.

The above objects are attained by providing a device having an elongated, thin strap flexible along its length and width so that it can conform to the inner curvature of the tire and a shorter, thin, narrower and stiffer band flexible along its length only and disposed lengthwise of the strap. The ends of the strap and band are slidably interconnected for limited relative movement and means is provided to removably suspend the ends of the device on the beads of a tire. The fact that both the strap and band are thin and flexible permits them to be placed in the tire beneath the curing tube and to be retained therein during the curing operation without impairing the latter. When the interconnected ends of the strap and band are joined and a pull exerted thereon, the band causes the curing tube to buckle. Both the band and strap are continued in motion to continue the bending of the tube and the exhaustion of air therefrom. The tire is then turned and the curing tube easily removed from the tire.

These and other objects of the invention are attained by the device, a preferred embodiment of which is described herein in conjunction with the accompanying drawings, wherein:

Figure 1 is a perspective view of the device, parts being broken away to show details of construction;

Figure 2 is an enlarged sectional view taken on the line 2—2 of Figure 1;

Figure 3 is an enlarged sectional view taken on the line 3—3 of Figure 1;

Figure 4 is a broken away elevational view of a modified form of buckler band used in the device;

Figure 5 is a fragmentary sectional view taken on the line 5—5 of Figure 4;

Figure 6 is a perspective view of a handle which can be used with the device;

Figure 7 is a vertical sectional diagrammatic view illustrating the initial position of the device in the tire;

Figure 8 is an elevational view of a detail of construction taken from the line 8—8 of Figure 7;

Figure 9 is a view similar to Figure 7 and illustrating the method of connecting the ends of the device prior to the exertion of a pulling force thereon;

Figure 10 is a view similar to Figure 8 and taken from the line 10—10 of Figure 9;

Figure 11 is a view similar to Figure 7 and illustrating the manner in which the curing tube is initially buckled prior to removal of the tube from the tire;

Figure 12 is a view similar to Figure 8 and taken from the line 12—12 of Figure 11; and Figure 13 is an enlarged sectional view taken on the line 13—13 of Figure 11.

Specific reference will now be made to the drawings wherein similar reference characters are used for corresponding elements throughout.

In its broadest aspect, the present invention comprises an elongated strap which is flexible along its length and its breadth, a shorter, stiffer, narrower band which is flexible only along its length and which is disposed lengthwise over the strap, a means slidably joining the end portions of the strap and band, and a means to removably suspend the ends of the device on the beads of a tire. When the ends of the device are joined by a handle or any other means and a pull is exerted thereon, limited relative movement is imparted to the strap or band so that the band serves as a buckling element.

More specifically, the device comprises a thin, long, relatively wide strap 10. The strap is preferably fabricated of rubber in which is embedded mesh steel wires 12 to reinforce the same without impairing the flexibility of the strap along its length and width.

A band 14 is provided which is also thin, but shorter, narrower and stiffer than the strap, although it is flexible along its length, as shown clearly in Figure 1. The band is preferably fabricated of spring steel and is disposed lengthwise on the strap.

As shown in Figures 4 and 5, the buckler band 14 may take the form of a series of longitudinal steel strands 16 joined at their ends by suitable plates 18.

Each end of the buckler band 14 is secured to a plate 20 which is in turn provided at its upper end with a generally U-shaped clip 22 adapted to grippingly engage the beads 24 of a tire 26, as shown in Figures 7, 9 and 11. The inner leg 28 of at least one of said clips 22 is provided with a transversely extending slot 30 and the web portion 32 of at least one of said clips 22 has struck therefrom a hook extension 34 adapted to engage in the slot 30, as shown clearly in Figures 9 and 11.

If desired, the hook extensions 34 may be dispensed with and the plates 20 may be joined by a suitable generally U-shaped handle 36, see Figure 6, having lateral extensions 38 on its legs adapted to removably engage the opposed slots 30 of the suspension clips 22 in a manner which will be obvious to one skilled in the art.

While the ends of the buckler band 14 may be fixedly secured to the plates 20, it is preferable that they be slidably secured to the said plates to permit the device automatically to be adjusted to different tire sizes. This is accomplished by providing a relatively short longitudinally extending slot 40 in each plate 20 adjacent its lower end, each end of the band 14 carrying a double-headed pin 42 slidably engaged in the slot, as shown in Figure 2. Cooperation of the pin 42 with the terminal portions of the slot 40 serves to limit the slide movement of the buckler band on the plate 20, as shown in Figures 8, 10, and 12.

The end portions of the strap 10 and the end portions of the buckler band 14 are joined together for limited sliding movement. This is accomplished by bending as at 44 the longitudinal edges of each plate 20 to provide a pair of bars 46 and 48 which are spaced as at 40 from the plate 20 itself. The longitudinal edges of the plate 20, at their juncture with the bars 46 and 48 are provided with longitudinally extending slots 52. Secured by means of suitable pins 54 to each end of the strap 10 is a further plate 56 which slides in the space 50 between the bars 46, 48 to the plate 20. The slide movement of the plate 56 is guided and limited by the provision of lateral extensions 58 at the upper end of the plate 56, the lateral extensions being engaged in the slots 52. Thus the cooperation of the lateral extensions 58 with the terminal portions of the slots 52 serves to limit the movement of the strap 10 relative to the buckler band 14, as shown clearly in Figures 8, 10 and 12.

Although the device as shown and described hereabove indicates that the ends of the strap 10 are slidable on the end portions of the buckler band 14, it will be understood that this can be reversed without impairing the function of the device.

The operation of the present device is as follows. The device is suspended by the clips 22 on the beads 24 of the tire 26, in the manner shown in Figure 7, the smooth inner surface of the band 10 being disposed beneath the curing tube 60. Because of the thinness and flexibility lengthwise of both the strap 10 and the buckler band 14, the strap and buckler band will conform to the inner contour of the tire. The device is positioned in the tire and retained therein during the entire time that the tire, curing tube and conventional collapsible metal rims over the curing tube (not shown) are retained in the mold in the retreading operation. The buckler band 14 will automatically adjust to the size of the tire and therefore, the pin 42 will either be at the top, the bottom or some intermediate position of the slot 40 in the plate 20. The lateral extensions 58 of the plate 56 carried by the strap 10 will engage the upper ends of the slots 52 in the plate 20, as shown in Figures 7 and 8.

After the tire has been cured, the air has been released from the curing tube 60 and the collapsible rim has been removed, the device is ready to be used for the removal of the curing tube. At this point, one of the hooks 34 is engaged in the opposite transverse slot 30 of the clip 22, as shown in Figure 9. If the device is not provided with the hooks 34, the handle 36 can be engaged in the transverse slots 30 for the same purpose. A pull is then exerted upwardly either on the handle or on the joined clips 22. As a result of this pull, the pins 42 carried by the buckler band 14 will first reach the bottom or stop position of the slots 40 in the plates 20. Thereafter, the strap 10 will move relative to the buckler band 14 because the plates 56 carried at the ends of the strap 10 will travel upwardly until the lateral extensions 58 engage the bottom or lower terminal portions of the slots 52 in the plates 20 carried by the buckler band 14, as shown clearly in Figure 12. At this point, the strap 10, because it is flexible along its width as well as along its length, will assume the position shown in Figure 13 and the band 14, being a non-stretch stiffer member, will create a buckle 62 in the curing tube 60, as shown in Figure 11. A continuation of the pull on the handle 36 or the joined clips 22 will further exhaust air from the curing tube and the entire device and the curing tube will move in unison out of the tire. The final removal is accomplished by turning the tire and continuing the pull on the device until the curing tube and device are pulled out of the tire.

Because the device is of such construction that it can be readily inserted inside the tire and retained therein throughout the entire time that the tire is in the curing mold, it will also be understood that the device can be easily operated with safety, to remove a curing tube which has accidentally been blown in the tire without removing the tire from the curing mold.

While a preferred embodiment of the invention has been shown and described hereabove, it will be understood that minor variations in the construction and arrangement of parts may be made by a skilled artisan without departing from the spirit of the invention and the scope of the appended claims.

I claim:

1. A device for removing a curing tube from a tire comprising an elongated flexible strap adapted for placement between the curing tube and tire, a shorter stiffer flexible elongated buckler band disposed lengthwise of the strap, means slidably interconnecting the ends of the strap with the end portions of the buckler band, and means to removably suspend the ends of the buckler band on the beads of the tire whereby removal of the suspension means from the tire and exertion of a pull thereon causes movement of the buckler band relative to the strap until buckling of the curing tube is effected.

2. The combination of claim 1 wherein said strap is made of reinforced rubber and said buckler band is made of steel.

3. The combination of claim 1 wherein said strap is made of reinforced rubber and said buckler band is comprised of a plurality of steel strands.

4. A device for removing a curing tube from a tire comprising an enlongated flexible strap adapted for placement between the curing tube and tire, a shorter stiffer flexible elongated buckler band disposed lengthwise on said strap, plates mounted on the ends of said buckler band and including means to removably suspend them on the beads of the tire, and means mounting the ends of said strap for limited sliding movement on said plates whereby removal of said suspension means from the tire and exertion of a pull thereon causes movement of said buckler band relative to said strap until buckling of the curing tube is effected.

5. The combination of claim 4 and transversely extending slots in said plates adjacent said suspension means, said slots being adapted to removably receive the ends of a pull handle.

6. The combination of claim 4 wherein said suspension means includes substantially U-shaped clips at the ends of said plates and adapted to grippingly embrace the beads of the tire, a transversely extending slot in the inner leg of at least one of said clips, and a hook extending from the other clip and adapted to engage in said slot whereby the ends of the device can be closed and a pull can be exerted thereon.

7. A device for removing a curing tube from a tire comprising an elongated flexible strap adapted for placement between the curing tube and tire, a shorter stiffer flexible elongated buckler band disposed lengthwise on said strap, plates mounted on the ends of said buckler band and including means to removably suspend them on the beads of the tire, and means mounting the ends of said strap for limited sliding movement on said plates whereby removal of said suspension means from the tire and exertion of a pull thereon causes movement of said buckler band relative to said strap until buckling of the curing tube is effected, said slide mounting means including inturned bars joined to the longitudinal edges of each plate and spaced therefrom, slots in said bars at their juncture with said plate, a member carried at each end of said strap and slidable in the space between said bars and said plate, and lateral extensions on said member extending through said slots, the terminal portions of said slots cooperating with said lateral extensions to limit the sliding movement of said strap relative to said band.

8. A device for removing a curing tube from a tire comprising an elongated flexible strap adapted for placement between the curing tube and tire, a shorter stiffer flexible elongated buckler band disposed lengthwise on said strap, plates, means mounting the ends of said buckler band for limited sliding movement on said plates, said plates including means to removably suspend them on the beads of the tire, and means mounting the ends of said strap for limited sliding movement on said plates whereby removal of said suspension means from the tire and exertion of a pull thereon causes movement of said buckler band relative to said strap until buckling of the curing tube is effected.

9. The combination of claim 8, wherein said means mounting said buckler band on said plates includes a longitudinally extending slot in each plate and a pin carried at each end of said buckler band and slidably engaged in said slot.

10. A device for removing a curing tube from a tire comprising an elongated relatively wide strap flexible both along its length and width and adapted for placement between the curing tube and tire, a shorter, narrower, stiffer elongated buckler band flexible only along its length and disposed lengthwise on said strap, means mounting the end portions of said strap for limited longitudinal sliding movement on the ends of said buckler band, and means to removably suspend the ends of said buckler band on the beads of the tire whereby removal of the suspension means from the tire and exertion of a pull thereon causes movement of the buckler band relative to the strap until buckling of the curing tube is effected.

References Cited in the file of this patent

UNITED STATES PATENTS

| Number | Name | Date |
|---|---|---|
| 1,482,446 | Stevens | Feb. 5, 1924 |